INVENTOR.
SIMON MIDDELHOEK
BY Stephen J. Limanek
ATTORNEY

United States Patent Office 3,427,600

Patented Feb. 11, 1969

3,427,600

MAGNETIC FILM MEMORY CELL WITH ANGULARLY DISPLACED EASY AXES

Simon Middelhoek, Kilchberg, Zurich, Switzerland, assignor to International Business Machines Corporation, New York, N.Y., a corporation of New York Filed Nov. 13, 1964, Ser. No. 410,929
Claims priority, application Switzerland, Nov. 27, 1963, 14,544/63
U.S. Cl. 340—174 12 Claims
Int. Cl. G11b 5/00

ABSTRACT OF THE DISCLOSURE

A magnetic film memory cell wherein the detrimental effects of skew and dispersion are rendered negligible is provided by arranging two mutually coupled anisotropic magnetic films so that their respective easy axes are displaced from each other by an acute angle $\alpha$ not exceeding 50°, the magnitude of this angle $\alpha$ being such that $(\alpha-2\beta)$ exceeds $\gamma$, where $\beta$ is the angular dispersion of the films and $\gamma$ is the effective skew angle between the resultant easy axis of the two films and a standard or nominal direction thereof (as defined, for example, by a word drive line). The two magnetic films are separated from each other by a layer of non-magnetic material thick enough to prevent any substantial exchange coupling between these films.

The invention concerns a thin film memory cell with anisotropic magnetic properties for the temporary storage of discrete information and a method for its production.

Magnetically anisotropic thin film cells for the temporary storage of binary information are already being used in the memories of information processing machines. An embodiment of such a memory is, e.g., described in U.S. patent application Ser. No. 217,768 filed by W. Dietrich et al., and now Patent No. 3,257,649.

In the design and production of thin film memories of large capacity for computing and data processing machines it is important that a sensible and economical comprise be made between the characteristics of the memory cells and those of the peripheral circuitry. For example, it is not satisfactory if the cells of a memory switch quickly while its peripheral units, such as write and sense amplifiers, are not equal to such high switching rates.

With the peripheral units cost considerations are also important, since a large memory requires a great many individual amplifiers. Savings in the cost of amplifiers thus significantly affect the total cost of the memory. For instance, there is considerable difference in cost between having to provide write amplifiers for bipolar pulses and making do with write amplifiers for unipolar pulses. A similarly great difference obtains with the sense amplifiers, depending upon whether they must discriminate between positive and negative signals or merely, to identify information read out, between signals being present or not present, i.e., be capable merely of unipolar amplitude discrimination.

It is relatively simple to use existing bipolar amplifiers for the discrimination of ternary signals, e.g. negative, zero, and positive. If, in conjunction with them, elements are used as memory cells that can assume three stable states, i.e. are capable of storing ternary coded data, an economical compromise between memory cells and peripheral units is again achieved. The advantage is that with the same number of individual memory cells and amplifiers, a greater information content can be accommodated in the memory owing to ternary coding of the information.

Obviously waste also has considerable influence on the total cost of a mass-produced thin film memory. This applies particularly to memory plates whose magnetic properties turn out unsatisfactorily in production and are thus outside the required tolerances. To ensure satisfactory functioning of known memories, the tolerance conditions for the magnetic properties of thin film cells are very stringent, which requires very elaborate fabrication techniques resulting in high costs. Further, it appears that extreme tolerance conditions that may be met in the laboratory cannot be fulfilled in mass production.

Experience has given rise to the need for seeking new possibilities in thin film memory technology for constructing memories of large capacity whose cost if possible does not exceed that of conventional, slower-operating, ferrite core memories, and that can be mass-produced with tolerance conditions feasible in such processes. This essentially outlines the object of the invention.

The invention therefore provides a new thin film cell with anisotropic magnetic properties for the temporary storage of discrete information, having input means for write-in and output means for read-out of information, characterized by the fact that a given information value, e.g., "0," is represented by a magnetization state such that when the output means are activated they produce a sense signal of very low amplitude, i.e. not more than 30% of that appearing when another information value, e.g., "1," is read out; this behavior being unaffected by deviations of ±10° of the externally discernible easy direction of magnetic anisotropy of the cell from the standard direction ($x$ direction) determined by the input and output means.

The method for producing such a thin film cell is characterized by the fact that, in a first stage, a first thin film of a ferromagnetic material is deposited onto a substrate plate at a first temperature (T1) in the presence of a magnetic D.C. field whose direction vector lies essentially in the plane of the film; that on top of it, in a second stage, a thin layer of a non-magnetic substance is deposited; and that on top of that, in a third stage, a second thin film of the ferromagnetic material is deposited at a second temperature (T2), lower than the first temperature (T1), again in the presence of a magnetic D.C. field whose direction in the film plane deviates by an angle not exceeding 50° from that of the D.C. field applied during the first stage.

Further characteristics and advantages of the new thin film cell and the method for its production are ilustrated by embodiments described in detail in the following with the aid of drawings.

In the drawings:

FIGS. 1$a$ through 1$c$ illustrate a thin film cell with differently positioned externally discernible easy directions, in conjunction with schematically shown input and output means.

FIGS. 2$a$ through 2$c$ are diagrams of the sense voltage amplitude $U_L$ occurring in the output means during read-out plotted against the bit field size $H_B$ generated during the preceding write-in by the input means, when the thin film cells of FIGS. 1$a$ through 1$c$ are of conventional type.

FIGS. 3$a$ through 3$c$ show a number of critical curves of a thin film cell with differenty positioned externally discernible easy directions, to illustrate the dispersion within a cell.

FIGS. 4$a$ and 4$b$ illustrate a memory plate used in a thin film memory, with a number of memory cells, having concave and convex skew of the easy direction outside the plate center.

FIGS. 5$a$ and 5$b$ show a memory cell magnetization state useable for data storage, the magnetization in practically all regions of the cell being homogeneously oriented positively (FIG. 5*a*) or negatively (FIG. 5*b*).

Figure 8A:
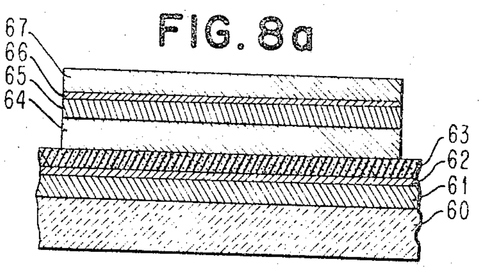
Figure 8B:
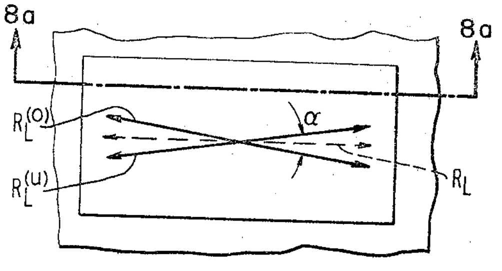

FIGS. 8*a* and 8*b* illustrate a cross section and a top plan view, respectively, of a thin film cell produced according to the method to be described.

Figure 1A:
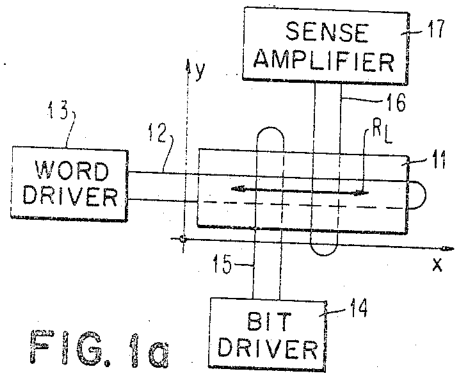
Figure 1B:
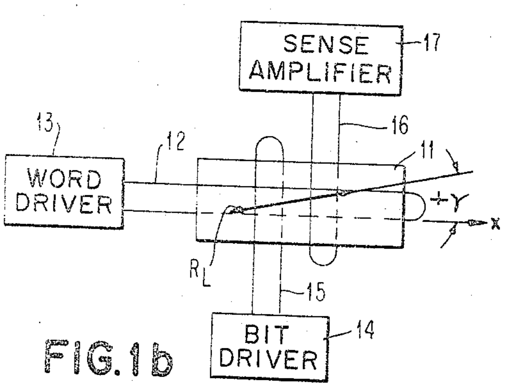
Figure 1C:
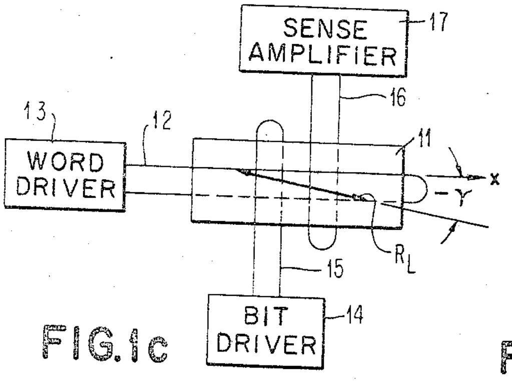
Figure 9A:
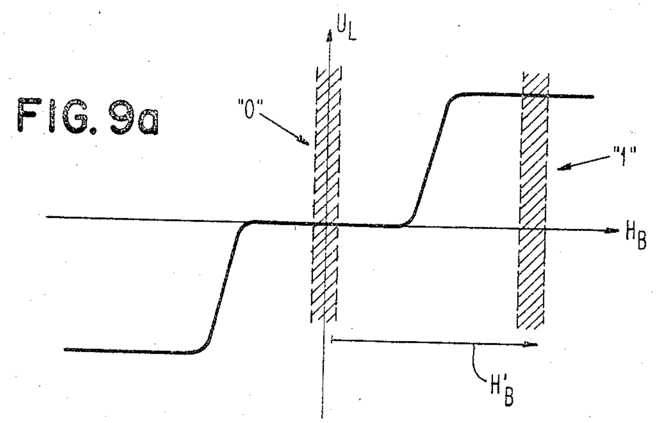
Figure 9B:
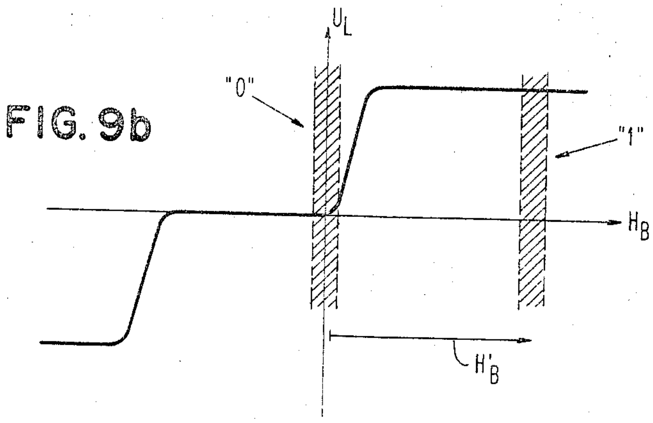
Figure 9C:
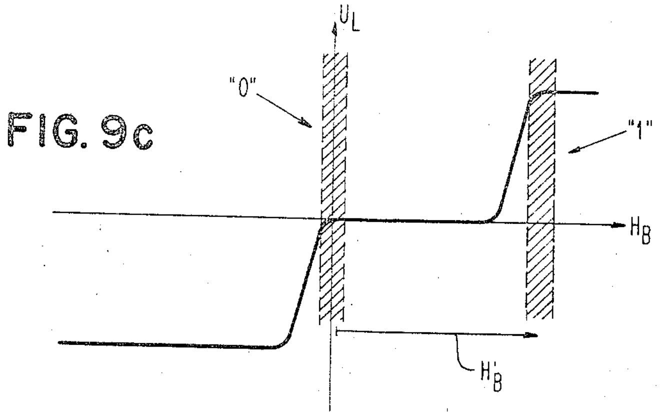

FIGS. 9*a* through 9*c* are diagrams of the same voltage amplitude $U_L$ appearing during read-out in the output means, vs. the bit fielld size $H_B$ generated during the preceding write-in by the input means when the thin film cells of FIGS. 1*a* through 1*c* of the drawing are of the inventive type.

FIGS. 1, 2, and 3 serve to illustrate the switching behavior in practice of conventional thin film cells in a thin film memory operated according to the so-called orthogonal field driving method. In the figures designated by 1*a*, 2*a* and 3*a*, a thin film cell 11 is considered whose externally discernible easy direction $R_L$ is parallel to the standard direction (*x* direction) determined by the input and output means. The figures designated by 1*b*, 2*b* and 3*b* and by 1*c*, 2*c* and 3*c*, respectively, show thin film cells whose externally discernible easy direction $R_L$ is at a certain angle $\gamma$ to the *x* direction, this angle being $+\gamma$ in FIG. 1*b* and $-\gamma$ in FIG. 1*c*.

As is known, in the orthogonal field driving method, for read-out and write-in a word field $H_W$ is applied in the *y* direction, i.e., at least approximately in the hard direction $R_H$, whose amplitude exceeds the saturation field strength $H_K$; so that the magnetization of the cell is deflected in the *y* direction and the cell magnetically saturated in that direction. A voltage $U_L$ thus induced in the output means during read-out, which is proportional to the change of the magnetization component in the *x* direction, i.e. $dMx/dt$, represents the information stored in the cell. During write-in, the polarity of a bit field $H_B$ acting orthogonally to the word field, i.e., in the *x* direction, determines the kind of information ("0" or "1") to be written in.

Word field $H_W$ is raised by a word pulse generated in a word driver 13 and passing along word line 12. Bit field $H_B$ is raised by a bit pulse generated in bit driver 14 and passing along bit line 15. In writing according to the orthogonal field driving method, the bit field representing the information must be present when the word field decays. In read-out the voltage $U_L$ induced into sense line 16 is delivered to a sense amplifier 17, where the kind of information ("0" or "1") read out is determined from amplitdue and form of the sense pulse by means of a discriminating circuit.

The input and output means—or more precisely, the axes of the word, bit, and sense lines, which are usually designed as strip lines—define an orthogonal system of coordinates whose standard direction, or *x* direction, ideally shown in FIG. 1*a* is parallel to the externally discernible easy direction $R_L$ of the magnetic anisotropy of the cell.

Figure 3A:
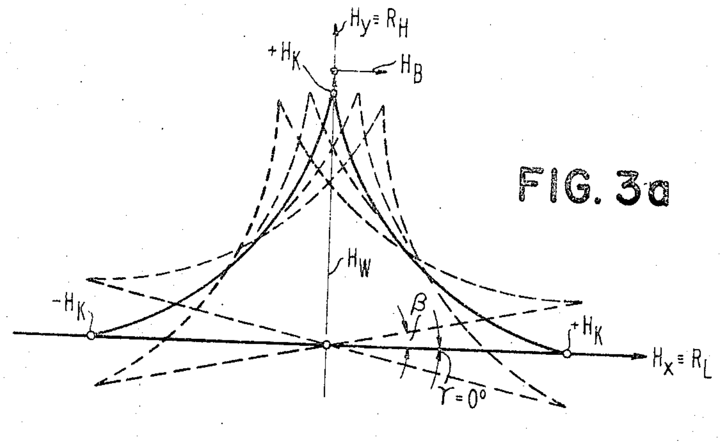
Figure 3B:
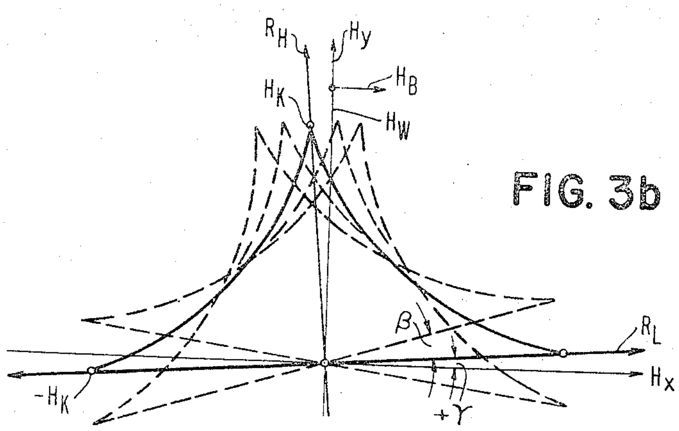
Figure 3C:
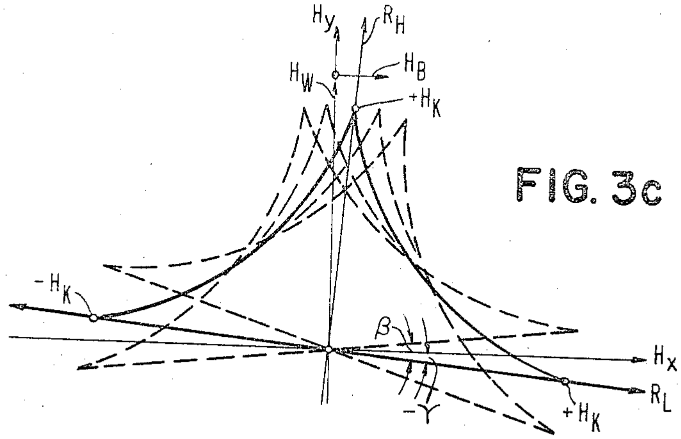
Figure 5A:
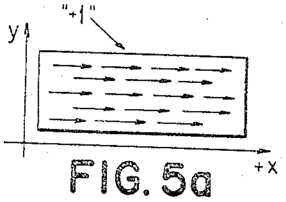
Figure 5B:
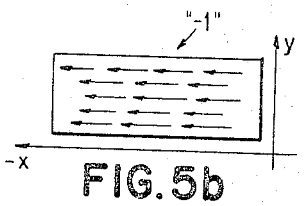

For a greater clarity, the "externally discernible" easy direction $R_L$ is defined as follows. It is known that thin film cells of the size used in magnetic memories, e.g., 0.7 mm. in length and 0.3 mm. in width, do not themselves have magnetic homogeneity, but instead consist of a number on individual crystallite groups that behave like single domains, i.e., that do exhibit homogeneous magnetic properties within themselves. Such a homogeneous group of crystallites with single domain behavior usually has an oblong form parallel to the easy direction and dimensions of the following order of magnitude: length approximately 2000 $\mu$m., or far more; witdh approximately 2 $\mu$m. As is known, the magnetic switching behavior of a single domain structure can be described by means of the so-called critical curve, an asteroid, which is, e.g., described somewhat in detail in U.S. patent application, Ser. No. 87,598 filed by H. J. Oguey, and now Patent No 3,244,901. The individual crystallite groups in each thin film cell have critical curves that differ, if only slightly, from each other, with variations in the values of the saturation field strength $H_K$ and dispersed easy directions of magnetic anisotropy. The latter phenomenon is called the angular dispersion of the easy direction. Of course only the superposition of all microcrystalline effects is accessible to macroscopic observation and externally measurable. The average of the local dispersions of the easy direction in the individual single-domain-like crystallite groups yields the externally discernible easy direction for an entire thin film cell that is designated with $R_L$ in FIGS. 1 and 3. Orthogona to $R_L$ is the so-called hard direction $R_H$. In FIGS. 3*a*, 3*b* and 3*c*, the angular dispersion of the easy direction is indicated by a number of critical curves drawn in broken lines. The maximum dispersion occurring in a thin film cell is designated with the angle $\beta$. It is clear that the maximum dispersion occurring in a cell must be overcome with the bit field $H_B$ if the magnetization in all crystallite groups or domains is to be oriented homogeneously in one easy direction, which, e.g., occurs for writing in certain information, e.g., "1," as indicated in FIG. 5*a* or 5*b*. The minimum value of the bit field required in the case of the critical curves shown in FIG. 3*a* is given by:

$$\tan \beta = \frac{H_B}{H_K}$$

Figure 2A:
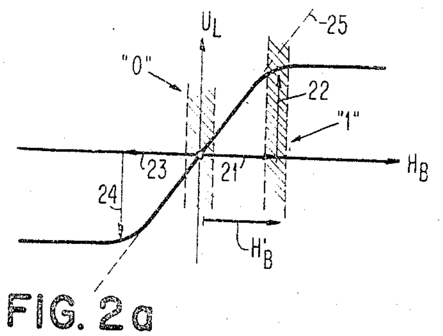

The $U_L/H_B$ diagrams shown in FIGS. 2*a*, 2*b* and 2*c* will now be described. The characteristic curves shown are experimentally determined with the arrangement shown in FIG. 1. Writing into cell 11 according to the orthogonal field driving method is simulated with different bit fields $H_B$. After each such write-in operation the read-out operation is simulated, the voltage induced into sense line 16 is observed, and its amplitude $U_L$ is recorded against the bit field $H_B$ previously applied. Conventional binary thin film memories operate with bipolar bit pulses; i.e., by applying a positive bit field 21, one obtains a positive amplitude 22 of the sense voltage when the one binary value is stored, while by applying a negative bit field 23, one obtains a negative amplitude 24 of the sense voltage when the other binary value is stored, as indicated in FIG. 2*a*. As has been mentioned, there is good reason for the current preference for working with unipolar amplifiers; i.e., only unipolar bit fields may be used. In this case the one binary value, e.g. "1," is written in with the aid of a positive bit field $H'_B$ and the other binary value, e.g. "0," without a bit field. The memory region for "1" and "0" resulting from this definition is indicated in the $U_L/H_B$ diagrams in FIGS. 2*a*, 2*b* and 2*c* by hatching. It should be noted that for reasons of economy the "1" memory region should not be placed too far to the right toward large values $H_B$; for the bit amplifiers would then have to produce very high power. In practice the "1" region is placed, as shown, at the beginning of the saturation region of the $U_L/H_B$ curve. The steepness or slope 25 of the $U_L/H_B$ curve permits inferences about the dispersion $\beta$ of the easy direction within the thin film cell. FIG. 3*a* shows that the dispersion is overcome by application of at least a certain size or magnitude of bit field $H_B$, and that only then does the magnetization in all crystallite groups orient itself homogeneously, which corresponds to the saturation region of the $U_L/H_B$ curve. With smaller values of $H_B$ a gradual decrease of the magnetization oriented in a certain direction in the crystallite groups results, until when $H_B=0$ it is oriented about one half to the right and the other half to the left.

Figure 2B:
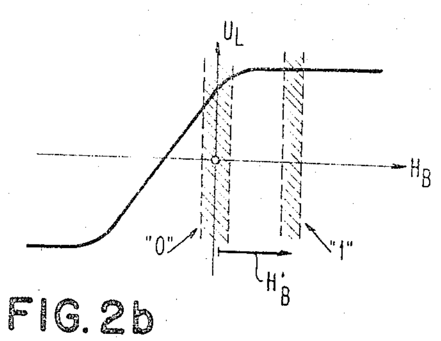
Figure 2C:
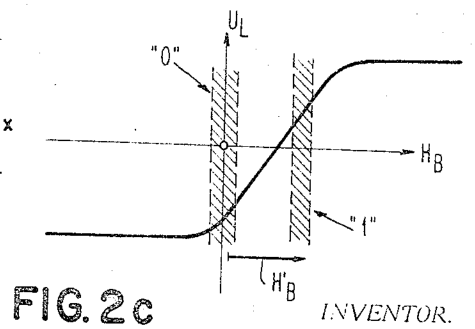

If, as is shown in the arrangement of FIGS. 1*b* and 1*c*, the externally discernible easy direction $R_L$ exhibits a skew $\gamma$, as indicated in FIGS. 3*b* and 3*c*, versus the standard direction (*x* direction) determined by the input and output means, then, as can be seen in FIGS. 2*b* and 2*c*, the $U_L/H_B$ curve is displaced to the left with a positive skew $\gamma$ and to the right with a negative skew $\gamma$.

Such skew $\gamma$ unfortunately cannot be entirely avoided in fabrication of the memory plates, as will be discussed in greater detail. As FIGS. 2*b* and 2*c* indicate, the skew is detrimental to memory operation, in that discrimination between the sense signals "0" and "1" with standard sense amplifiers becomes practically impossible. For example, with a positive skew $\gamma$ the sense signal amplitude for "0" is greater than is that for "1" in the case of a negative skew $\gamma$.

Figure 4A:
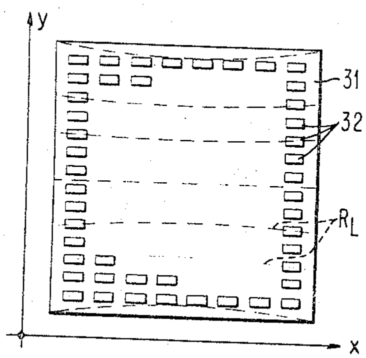
Figure 4B:
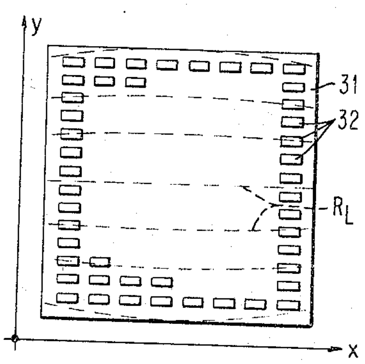

FIGS. 4*a* and 4*b* show memory plates 31 such as are used, e.g., in thin film memories. On them are a number of individual, e.g., rectangular, thin film cells 32 with uniaxial magnetic anisotropy, whose easy direction $R_L$ across the entire plate exhibits in FIG. 4*a* a so-called concave and in FIG. 4*b* a convex skew. As is known, the magnetic anisotropy is imparted during production of the memory plates, e.g., during vapor deposition of the ferromagnetic films, by the presence of a magnetic D.C. field. It is the practice to vapor-deposit a continuous ferromagnetic film, usually an alloy of 80% Ni and 20% Fe, onto the entire memory plate 31, which is then subjected to a local photo-etching process. This process removes the ferromagnetic film, with the exception of those points or areas which are to become the memory cells 32.

It turns out that with both concave and convex skew, cells with positive and negative angles $\gamma$ are present on a memory plate. These deviations are naturally greatest toward the corners of the plate. The *x/y* system of coordinates drawn in FIGS. 4*a* and 4*b* is determined by the input and output means. Obviously the operating conditions vary from cell to cell for memory plates having such skew of the easy direction $R_L$; all the cases illustrated in FIGS. 1 through 3*c* of the drawings occur in practice.

The skew described can have various causes; among them are posssible inhomogeneities of the magnetic D.C. field used to impart the magnetic anisotropy during vapor deposition of the ferromagnetic films. This field is usually generated by a known Helmholtz coil arrangement with the memory plate at its center. Other causes are magnetostrictive effects within the vapor-deposited ferromagnetic material; even insignificant mechanical tensions within the plate that arises during vapor deposition, e.g., owing to the temperature gradient, can result in magnetostrictive skew. With positive magnetostriction, which occurs when the alloy is composed of less than approximately 80% Ni and more than 20% Fe, a concave skew usually results, as indicated in FIG. 4*a*. With negative magnetostriction, which occurs when the alloy is composed of more than approximately 82% Ni and less than 18% Fe, a convex skew usually results, as indicated in FIG. 4*b*.

To store information one can employ magnetization states of the thin film cell such as are shown in FIGS. 5*a* and 5*b*. Here the magnetization in practically all regions of the cell is oriented in a homogeneous position parallel to the easy direction. It is sufficient if the resulting magnetization component parallel to the standard direction (*x* direction) reaches approximately 80% of the maximum value of 100%, i.e., of saturation. In FIG. 5*a*, the magnetization is oriented parallel to the standard direction and has a positive value, while in FIG. 5*b* it has a negative value. The magnetization state shown in FIG. 5*a* can, e.g., be used to store an information value "+1," while that shown in FIG. 5*b* can represent a stored value "−1". As has been mentioned, the magnetization states shown here can be obtained by choosing a bit field $H_B$ sufficiently large to overcome the maximum dispersion occurring in a cell. The magnetization in all crystallite groups or regions then homogeneously orients itself in an easy direction; in the $-x$ direction with a negative bit field $H_B$ and in the $+x$ direction with a positive bit field $H_B$.

Figure 6:
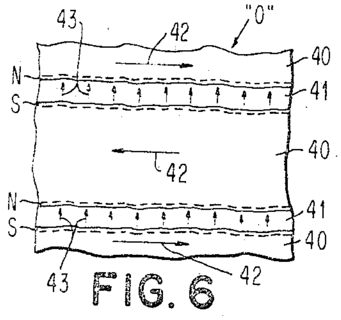
FIG. 6 illustrates a section of a thin film cell having a different magnetization state useable for data storage, with alternating orientation of mangetifiation without locking.

In principle, further stable magnetization states of a thin film cell are suitable for data storage, e.g., that in FIG. 6 which shows a greatly enlarged section of a thin film cell. The cell is split into a number of narrow magnetization regions 40, separated by the Néel walls 41 familiar from the physics of ferromagnetism. These regions 40 extend lengthwise, usually along the entire cell, essentially parallel to the easy direction, that is practically also parallel to the *x* direction. The magnetization, shown by arrows 42, is alternatively positively and negatively oriented. The magnetization within the Néel walls has components 43 directed upward if, as is assumed here, the cell was previously saturated in the positive hard direction $R_H$. At the upper and lower boundaries of the Néel walls 41 magnetic poles occur, schematically suggested by N and S, that exert certain forces on the magnetization 42 in regions 40. If the width of regions 40 is relatively large, these forces have practically no effect on the position of magnetization 42. To illustrate the relative dimensions of the regions 40 and the Néel walls 41 that obtain here, a few indications will be given in the following that have been observed in numerous cases in practice. Assuming that the thickness of the ferromagnetic film of the cell is approximately 500 A., Néel walls of approximately 400 A. width are obtained; the width of regions 40 is of the order of 200 $\mu$m.

Figure 7:
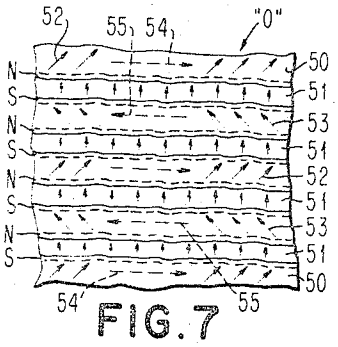
FIG. 7 illustrates a section of a thin film cell having yet another magnetization state useable for data storage, with locking of the magnetization in the hard direction.

A somewhat different magnetization state of a thin film cell is shown in FIG. 7. The state shown here is called the locked state. Here too there has been splitting into a number of magnetization regions 50, again extending lengthwise parallel to the easy direction and thus essentially also to the *x* direction. Again Néel walls 51 separate these magnetization regions 50. As before, magnetic poles, schematically suggested by N and S, occur at the upper and lower boundaries of the Néel walls. Here, however, in contrast to the previous case, the magnetization regions 50 are much narrower, so that the magnetic forces emanating from the poles have considerable influence on the magnetization in regions 50. Through these internal coupling forces the magnetization undergoes a deflection upward, suggested by arrows 52 and 53. The broken arrows 54 and 55 indicate the position that the magnetization would assume in the absence of internal coupling forces. The dimensions of the regions 50 and the Néel walls 51 for a film thickness of approximately 500 A. are as follows: the width of Néel walls 51 is of the order of 2 $\mu$m., while the width of the regions 50 is approximately 20 $\mu$m. There are cases, however, where regions 50 may be significantly narrower, as little as 2 $\mu$m. minimum. The dimensions in the case of a locked state, as is shown in FIG. 1, are essentially depedent upon the film thickness. As was pointed out, the dimension given here apply for a film thickness of approximately 500 A.

In two magnetization states shown in FIGS. 6 and 7, the magnetization components in the *x* direction do not differ significantly from zero on the average; both states are thus equivalent for storing a certain information value, e.g., "0." With the orthognoal field driving method, both states may occur on one memory plate.

FIG. 8*a* shows a section, and FIG. 8*b* a top plan view, of a thin film cell in which practically no undesirable effects result from certain deviations of the externally discernible easy direction $R_L$ of the magnetic anisotropy of the cell from the standard direction (*x* direction) determined by the input and output means. The cell consists essentially of a sandwich film of two layers of a ferromagnetic material. e.g., Permalloy, with a non-magnetic layer between them. The non-magnetic layer can be an insulating layer, e.g., silicon oxide, or can be metallic, e.g., silver. It is advantageous if the non-magnetic intermediate layer is easily etched, since it must be etched away together with the ferromagnetic film in the formation of the individual memory cells. The substrate on which the ferromagnetic sandwich film is deposited can be either a compact silver plate or a glass plate covered with a silver layer. It is preferable to place an insulating layer of silicon oxide between the substrate and the ferromagnetic sandwich film. To improve the adhesion properties of the ferromagnetic film on the silver base, covering the silver layers with a thin chromium surface has proved suitable. The section of a thin film cell shown in FIG. 8*a*, which in a section taken through the line **8*a*—8*a*** of FIG. 8*b*, shows a glass plate 60 serving as substrate, with its upper surface carrying a silver layer 61 on top of which is a chromium layer 62. Above the chromium layer 62, the substrate plate is equipped with an insulating silicon oxide layer 63. The actual thin film cell consists of a lower nickel-iron film 64, overlaid with a silver layer 65 that is covered with a chromium layer 66, above which is an upper nickel-iron film 67.

Appropriate measures taken during fabrication of the nickel-iron films 64 and 67 ensure that the easy directions in the two films 64 and 67 deviate from one another by a certain angle $\alpha$. In FIG. 8*b* the easy directions in the lower 64 and the upper 67 film are designated with $R_L^{(u)}$ and $R_L^{(o)}$, respectively. An externally discernible easy direction $R_L$ for the thin film cell as a whole, shown by broken lines in FIG. 8*b*, results from superposition.

The thickness of each nickel-iron film is preferably between 100 and 600 A. The non-magnetic intermediate layer should have a thickness such that the exchange coupling between the two nickel-iron films becomes practically insignificant. If e.g., a silicon oxide layer is used as the non-magnetic substance, its thickness should be at least 50 A; but it can be thicker, up to approximately 350 A. If a silver layer is used as the non-magnetic substance, its thickness should be of the same order of magnitude, such as, 250 A. ± 200 A.

The method for production of a thin film cell, such as that shown, e.g., in FIGS. 8*a* and 8*b*, described hereinbelow has proved to be successful in practice. The layers are vapor-deposited in a vacuum apparatus. In a first stage, the lower nickel-iron film 64 is vapor-deposited onto a suitably prepared substrate. Evaporation takes place at a temperature T1 and in the presence of a magnetic D.C. field, e.g., generated by Helmholtz coils, whose direction vector lies essentially in the film plane. Temperature T1 can be in the range 100–450° C. Next, the non-magnetic intermediate layer 65 is evaporated, which, as has been mentioned, may be of silicon oxide or silver. Then, the chromium layer 66, if required, can be evaporated. Finally the upper nickel-iron film 67 is evaporated at a temperature T2. Temperature T2 should be at least 50° C. lower than temperature T1 so that undesirable tempering effects on the nickel-iron film 64 are avoided. The vapor deposition of the non-magnetic intermediate layer 65 should also take place at temperature T2 for that reason. This is important because the nickel-iron film 67 is also vapor-deposited in the presence of a magnetic D.C. field, whose direction in the film plane deviates by an angle $\alpha$ from that of the D.C. field used during deposition of the nickel-iron film 64. The size of the angle $\alpha$ is not critical, but the following condition should be met:

$$(\alpha-2\beta)>\gamma$$

Experience has shown that the angle $\alpha$ should not exceed 50°.

As mentioned hereinabove, the magnetic D.C. field can be generated by a Helmholtz coil arrangement, which should have as homogeneous a field distribution as possible in the area of the substrate plate. The above deviation by angle $\alpha$ can most simply be achieved by turning the coil arrangement relative to the substrate plate.

Another possibility for generating the magnetic D.C. field in the production method described above consists in the use of two Helmholtz coil arrangements whose axes are at right angles to each other, and whose individual fields should again have as homogeneous a field distribution as possible in the area of the substrate plate. The superposition of these fields results in the magnetic D.C. field required for imparting magnetic anisotropy. With two Helmholtz coil arrangements, the deviation by angle $\alpha$ can be achieved quite simply by reversal of the current passing through one coil arrangement. Clearly the size of this current determines the size of the angle $\alpha$.

The method just described can of course be employed for an entire memory plate onto which the ferromagnetic sandwich films mentioned are continuously deposited. A storage matrix with a number of thin film cells, e.g., as shown in FIGS. 8*a* and 8*b*, can be produced by precise etching of the ferromagnetic sandwich film including the non-magnetic material, so that the number of desired individual thin film cells is formed at those points where no etching takes place. Rectangular thin film cells have proved to be very advantageous in which the externally discernible easy direction $R_L$ runs essentially parallel to the longer sides. Such thin film cells are arranged in rows and columns on a memory plate. Strip-shaped conductors representing the bit, word, and sense lines, with the corresponding insulating layers, are then vapor-deposited in rows and columns, or vice versa, onto the memory plate.

If in the arrangement of FIG. 1 the thin film cell of FIGS. 8*a* and 8*b* is used, one can, as described earlier, determine for it the $U_L/H_B$ diagram showing the sense voltage amplitude $U_L$ induced in the output means during read-out plotted against the bit field $H_B$ generated by the input means during the preceding write-in. The characteristic $U_L/H_B$ curves obtained for various angles $\gamma$ are shown in FIGS. 9*a*, 9*b*, and 9*c* of the drawings. The determining characteristic of this curve is its step form, that is the horizontal section of this curve for $U_L=0$. As a result of the step form one obtains, for the stored information values "0" and "1," sense signals $U_L$ that are alike even for different angles $\gamma\neq0$. This applies not only, as shown in FIGS. 9*a*, 9*b* and 9*c*, to binary data, but also to storage of ternary values, where, e.g., the value "0" is written in without a bit field, the value "+1" with a positive bit field $H'_B$ and the value "−1" with a negative bit field $H'_B$. In reading out by the orthogonal field driving method, one then receives no signal $U_L$ for a "0," a distinct positive sense signal $U_L$ for "+1," and a distinct negative sense signal $U_L$ for "−1." Sense signals $U_L$ are not adversely affected by angle deviations $\gamma$ of ±10° of the externally discernible easy direction $R_L$ of the magnetic anisotropy of the thin film cell from the standard direction ($x$ direction) determined by the input and output means. It is usually not very critical if, e.g., as the sense signal for a "0," a certain small value different from zero appears. The discrimination circuits in the sense amplifiers are capable of unequivocal discrimination even when the amplitudes of the sense signals for "0" and "1" are such that the smaller amplitude, such as for "0," does not exceed 30% of that appearing for the other information value, e.g., "1." The diagrams in FIGS. 9*a*, 9*b* and 9*c* clearly show that this safety limit is far from being reached.

Although the basic characteristics of the invention are shown and described in application to a preferred embodiment, it is clear that those skilled in the art may make numerous omissions, substitutions, and changes in form and in detail of the new thin film element and of the method for its production without departing from the scope of the invention.

What is claimed is:

1. An information storage cell comprising:

first and second anisotropic magnetic films respectively having first and second easy axes disposed relative to each other at an acute angle $\alpha$ not exceeding 50° and providing a resultant easy axis in said cell;

a layer of non-magnetic material interposed between said first and second magnetic films, said non-magnetic layer having a thickness such that the exchange coupling between said magnetic films is substantially zero;

means including a conductor disposed with respect to said resultant easy axis at a given angle $\gamma$ within approximately 10° thereof for varying the magnetization within said cell;

and means for detecting said magnetization variations;

the relationship among said acute angle $\alpha$, said given angle $\gamma$ and the angular dispersion $\beta$ of said magnetic films being such that $(\alpha-2\beta)$ exceeds $\gamma$.

2. A system as set forth in claim 1 wherein said magnetization varying means applies to said cell a magnetic field in a direction substantially perpendicular to the length of said conductor to substantially magnetically saturate all portions of said first and second magnetic films in said perpendicular direction.

3. A system as set forth in claim 2 wherein said magnetization varying means applies simultaneously to said cell a second magnetic field in a direction substantially parallel to the length of said conductor to magnetize each of said first and second magnetic films along its easy axis in the direction of said second magnetic field.

4. A system as set forth in claim 3 wherein said second magnetic field applying means selectively applies a magnetic field of a positive or negative polarity.

5. A system as set forth in claim 3 wherein said magnetization detecting means applies to said cell a magnetic field in a direction substantially perpendicular to thelength of said conductor to substantially magnetically saturate all portions of said first and second magnetic films in said perpendicular direction, said cell exhibiting a $U_L/H_B$ characteristic having an extended horizontal region intermediate positive and negative saturation regions, where $U_L$ is induced output voltage amplitude detected by said detecting means and $H_B$ is a magnetic field corresponding to said second magnetic field.

6. A method for producing a thin film cell comprising the steps of: depositing a first thin film of ferromagnetic material onto a substrate plate at a first temperature in the presence of a magneitc direct current field having a given direction substantially in the plane of said first film, depositing a thin layer of non-magnetic substance onto said first film, depositing a second thin film of ferromagnetic material onto said non-magnetic layer at a second temperature lower than that of said first temperature in the presence of a magnetic direct current field having a direction substantially in the plane of said second film deviating from said given direction at an angle not exceeding 50°.

7. A method as set forth in claim 6 wherein the non-magnetic substance is deposited to a thickness such that the exchange coupling between the first and second thin films of ferromagnetic material is at least approximately zero.

8. A metheod as set forth in claim 6 wherein said non-magnetic substance is deposited at a temperature substantially equal to that of said second temperature.

9. A method as set forth in claim 6 wherein said first temperature is between 100° C. and 450° C. and wherein said second temperature is at least 50° C. lower than said first temperature.

10. A method as set forth in claim 6 wherein the magnetic direct current field applied to each said film is a resultant magnetic direct current field produced by first and second magnetic direct current fields disposed at right angles to each other, said angle deviation being achieved by reversing the direction of one of said first and second fields.

11. A method as set forth in claim 6 wherein a layer of silver is deposited on a glass plate and a layer of chromium is deposited on said silver layer to form said substrate plate.

12. A method as set forth in claim 6 further including etching from said substrate plate said first and second films and said layer of non-magnetic substance to form a plurality of rectangular thin film cells having an easy axis of magnetic anisotropy forming a smaller angle with its longer side than with its shorter side.

References Cited

UNITED STATES PATENTS 3,175,201 3/1965 Slonczewski -------- 340—174

OTHER REFERENCES

Chang, Hsu: "Coupled Biaxial Films," J. App. Physics, v. 35, n. 3 (part 2), pp. 770–771, March 1964.

TERRELL W. FEARS, *Primary Examiner.*

JOSEPH F. BREIMAYER, *Assistant Examiner.*